United States Patent Office 2,970,059
Patented Jan. 31, 1961

---

2,970,059

**WAX-TYPE POLISH USING POLYCHLORO-
ALKYLBENZENES**

Edward A. Swakon, Hammond, Ind., assignor to Standard
Oil Company, Chicago, Ill., a corporation of Indiana No Drawing. Filed Aug. 15, 1958, Ser. No. 755,146

7 Claims. (Cl. 106—8)

---

This invention relates to wax-type polish compositions and particularly wax-type floor polishes.

An object of the invention is a polish composition affording equal or better protective and polishing properties than given by waxes. Another object is a wax-solvent-type polish. A further object is a wax-emulsion-type polish. A particular object is a wax-type floor polish; a more particular object is a dry-bright, wax-emulsion-type floor polish. A specific object of the invention is a wax-type polish which has all of the desirable characteristics of carnauba wax-containing polishes. Other objects become apparent in the course of the detailed description of the invention.

The wax-type-polish composition of the invention includes the particular ingredient, polychloroalkylbenzene, having a melting point between about 45° C. and about 100° C., containing from 1 to about 22 carbon atoms in each alkyl group, wherein all of the chlorine content is substituted on the benzene nucleus, and may contain any one, or a number of, the waxes, solvents, emulsifiers, etc. contained in presently-available wax-type polish compositions.

The alkylbenzene portion of the polychloroalkylbenzene waxy component of the polish of the invention may be toluene, a xylene isomer, ethylbenzene, or any other alkylbenzene containing one or more alkyl groups. It is to be understood that the number of alkyl groups is limited by the requirement that two or more nuclear substituent chlorine atoms be present. The polish may contain one, or a mixture of, the polychloroalkylbenzenes; it is to be understood that, frequently, individual compounds which have suitable melting points give a mixture whose melting point is not suitable for use as a wax component of a polish. The polychloroalkylbenzene component has a melting point between about 45° C. and about 100° C. The particular polychloroalkylbenzene used for any specific polish composition will be determined by the requirements with respect to melting point and surface protection of that particular polish.

The following polychloroalkylbenzenes have suitable melting points and waxy characteristics for use in the wax-type polish compositions of the invention:

2,3,4-trichlorotoluene;
2,3,5-trichlorotoluene;
2,4,5-trichlorotoluene;
2,3,4,5-tetrachlorotoluene;
2,3,4,6-tetrachlorotoluene;
2,3,5,6-tetrachlorotoluene;
3,6-dichloro-o-xylene;
4,5-dichloro-o-xylene;
3,4,6-trichloro-o-xylene;
3,4,5-trichloro-o-xylene;
4,6-dichloro-m-xylene;
2,4,5-trichloro-m-xylene;
2,5-dichloro-p-xylene;
2,3,5-trichloro-p-xylene.

It is understood that this listing of illustrative compounds is not limiting.

The defined polychloroalkylbenzene may be used to replace, or be used along with the vegetable waxes, mineral waxes, insect waxes, and animal waxes now used in wax polishes. The trichloro-p-xylenes are particularly good as a replacement for expensive carnauba wax and other high melting point vegetable waxes. The polychloroalkylbenzene waxy materials may be introduced into conventional polish formulas with little or no modification when used as a replacement, particularly for vegetable waxes. There appears to be no limitation on the type of polish in which the defined polychloroalkylbenzene can be used. For this reason, no detailed listing of polish formulas in included herein. The polish formulas included in Modern Polishes and Specialties, by W. D. John (Chemical Publishing Company, Inc., 1947) are particularly apt. Additional information on conventional polishes wherein the defined polychloroalkylbenzenes are suitable replacements for waxes appears in The Chemistry and Technology of Waxes, by A. H. Warth (Reinhold Publishing Corporation, 1956).

*Illustration*

A dry-bright, wax-emulsion-type floor polish was made up utilizing a well-known conventional carnauba wax formula. The polish was made up by preparing separately (1) a mixture consisting of distilled water, 250 grams; stearic acid, 5 grams; borax, 3 grams; triethanolamine, 6.5 grams; and carnauba wax in polish I (trichloro-p-xylenes in polish II replaced the wax), 40 grams; and (2) a solution of distilled water, 140 grams; ammoniacal solution (28% ammonia), 2 grams; and light yellow shellac, 1.5 grams. The wax mixture was prepared by melting the waxy material, acid, and amine in a double boiler at about 90° C. The borax was dissolved in the water and brought to boiling. The hot borax solution was rapidly stirred into the wax solution. The mixture was allowed to cool to room temperature while being slowly stirred. The shellac solution was added to the cooled wax solution to prepare the final wax-emulsion floor polish.

Illustrative-polish I was made up with carnauba wax; this polish had a rather dirty tan color. Illustrative-polish II was made up with trichloro-p-xylene; the trichloro-p-xylene polish had an attractive milky white apperance. The two illustrative polishes were applied to asphalt tile flooring; the sheen imparted by each polish was essentially identical. The trichloro-p-xylene polish II was very much less slippery than the carnauba wax polish I. This is an important desirable characteristic since it eliminates the need for anti-skid agents.

Thus having described the invention, what is claimed is:

1. A wax-type polish composition consisting essentially of a polychloroalkylbenzene having a melting point between about 45° C. and about 100° C., between 1 and about 22 carbon atoms in each alkyl group and said chlorine being nuclear substituents an emulsifier and water.

2. The polish of claim 1 wherein said polychloroalkylbenzene is a trichlorotoluene.

3. The polish of claim 1 wherein said polychloroalkylbenzene is a tetrachlorotoluene.

4. The polish of claim 1 wherein said polychloroalkylbenzene is a dichloro-o-xylene.

5. The polish of claim 1 wherein said polychloroalkylbenzene is a dichloro-p-xylene.

6. The polish of claim 1 wherein said polychloroalkylbenzene is a trichloro-p-xylene.

7. A dry-bright wax-emulsion-type floor polish consisting essentially of, in relative parts by weight, trichloro-p-xylene, 40; stearic acid, 5; triethanolamine, 6.5; borax, 3; shellac, 1.5; 28% ammoniacal solution, 2; and water, 390.

References Cited in the file of this patent

UNITED STATES PATENTS

| | | |
|---|---|---|
| 2,010,841 | Bender | Aug. 13, 1935 |
| 2,275,659 | Steinle et al. | Mar. 10, 1942 |
| 2,374,414 | Cartwright | Apr. 24, 1945 |